Patented Dec. 2, 1952

2,620,290

UNITED STATES PATENT OFFICE 2,620,290

ALPHA, OMEGA-THIOCYANOALKANOL INSECTICIDAL COMPOSITIONS AND THEIR USE

Norman E. Searle, Wilmington, Del., assignor to E. I. du Pont de Nemours & Company, Wilmington, Del., a corporation of Delaware No Drawing. Application October 23, 1947, Serial No. 781,761

7 Claims. (Cl. 167—22)

This invention relates to new organic nitrogen-sulfur compounds. More particularly, it relates to new thiocyanoalkanols, to a process for their preparation, and to insecticidal compositions containing them.

All previous attempts to prepare a stable thiocyanoalkanol have resulted in failure. For example, thiocyanoethanol obtained either by passing ethylene oxide into an ether solution of HCNS, or by reaction of potassium thiocyanate with an excess of ethylene chlorohydrin [J. Gen. Chem. (U. S. S. R.) 7, 1390–6 (1937); Chem. Abs. 32, 2534 (1938)] immediately reacted further with the evolution of carbon oxysulfide gas to form heterocyclic compounds such as 1-(hydroxyethyl)-2-mercaptodihydroimidazole and 2-mercaptooxazolide.

It has now been discovered that alpha, omega-thiocyanoalkanols in which the hydroxyl and thiocyano groups are separated by a bivalent polymethylene radical of 4 to 5 carbon atoms, in contrast to the 2-thiocyanoethanol, are stable and surprisingly water-soluble. Furthermore, these products show unexpected insecticidal properties, and water solutions of these materials applied against insects such as houseflies possess unusually rapid paralytic activity comparable in 2% concentration to standard pyrethrum sprays in kerosene.

The thiocyanoalkanols of this invention are 4-thiocyanobutanol-1 and 5-thiocyanopentanol-1 and may be represented by the formula $HO(CH_2)_nSCN$ wherein $n$ is 4 to 5 inclusive.

The alpha,omega-thiocyanoalkanols of this invention can be produced by reacting an inorganic salt of thiocyanic acid with an alpha,omega-halogenoalkanol of the formula $HO(CH_2)_nX$, wherein X is halogen of atomic weight 35 to 128 and $n$ is 4 to 5 inclusive.

In another embodiment of the invention the new thiocyanoalkanols can be obtained through alcoholysis of a selected ester of the alpha,omega-thiocyanoalkanols in accordance with the following scheme:

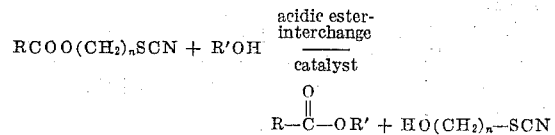

wherein the R and R' hydrocarbon radicals are so selected as to effect easy separation of the resulting thiocyanoalkanol from the other components present in the alcoholysis reaction. Preferably the R and R' radicals are alkyl radicals of 1 to 3 carbon atoms, for example, such as methyl and ethyl. The ester of the alpha,omega-thiocyanoalkanol can be produced by reacting an inorganic salt of thiocyanic acid with an omega-halogenoalkyl ester of the formula

wherein X is halogen of atomic weight 35 to 128, R and $n$ being defined as aforesaid.

A preferred method of employing the new thiocyanoalkanols of the invention is in the form of aqueous solutions. For example, aqueous solutions preferably in amounts of from 0.5–2% concentrations of the thiocyanoalkanols give very satisfactory insecticide sprays particularly as household fly sprays.

This invention is further illustrated by the following examples in which parts are given by weight unless otherwise indicated.

Example I 4-chlorobutyl acetate prepared from tetrahydrofuran by the method of Cloke and Pilgrim (J. A. C. S. 61, 2667–9 (1939)) was converted to 4-thiocyanobutyl acetate through thiocyanation, that is, replacement of the halogen atom with a thiocyano group, with potassium thiocyanate (see copending application, Serial Number 757,339, now Patent No. 2,467,235 issued April 12, 1949, of which the present application is a continuation-in-part). A solution of 121.1 parts of 4-thiocyanobutyl acetate with 224 parts of methanol containing 0.7 part of p-toluenesulfonic acid monohydrate was refluxed under an 18-inch packed column until the head temperature corresponded with the boiling point of the methanol-methyl acetate azeotrope. The mixture was then slowly distilled to remove the methanol-methyl acetate azeotrope boiling at 53–56° C. After the azeotropic mixture (64 parts) had been completely removed most of the excess methanol was distilled off and the residual product was distilled under vacuo from a 6 inch Vigreaux column. This distillate amounted to 84 parts (92% of the theory) of slightly yellow oil boiling at 130–134° C./1 mm. After further purification of the 4-thiocyanobutanol-1 by successive distillation, washing with sodium bicarbonate solution, and finally by molecular distillation, a colorless oily product was obtained which boiled at 34–35° C. under a pressure of $1 \times 10^{-4}$ mm.; $n_D^{25}$ 1.4974.

Anal. calc'd for $C_5H_9NOS$: N, 10.7; S, 24.4. Found: N, 10.84, 10.82; S, 24.66, 24.85.

A 2% aqueous solution of this 4-thiocyanobutanol-1 when sprayed against houseflies according to the Peet-Grady method (see Soap and Sanitary Chemicals Annual (1946) Blue Book) paralyzes 98% of the flies in 4 minutes, 100% in 6 minutes and effects a kill of 98% of the flies after 24 hours. In comparison a standard pyrethrum spray (Official Test Insecticide) containing 100 mg. of pyrethrins/100 cc. of kerosene gives 99% paralysis of the flies in 3 minutes and a 24 hour kill of 35% of the flies.

Although aqueous solutions are preferable, the 4-thiocyanobutanol-1 can also be applied from solutions of acetone wherein the compound is easily soluble. For example, complete kills of aphids and red spiders respectively are obtained on spraying these insects with a 2% acetone solution of the compound.

*Example II*

As described in Example I, 5-chloropentyl acetate prepared in accordance with the general method of Cloke and Pilgrim referred to above by substituting tetrahydropyran for tetrahydrofuran was converted to the 5-thiocyanopentyl acetate from which the thiocyanoalkanol was obtained using the alcoholysis procedure previously outlined in Example I. After removal of the theoretical amount of methanol-methyl acetate azeotrope and excess methanol by distillation, the residue was diluted with an equal volume of methylene chloride and washed with 10% sodium chloride solution until neutral. Fractionation through an 18-inch saddle-packed column gave 5-thiocyanopentanol-1, a colorless oil, boiling between 109° C./1.4 mm. and 112° C./1.6 mm.; $n_D^{25}$ 1.4971.

Anal. calc'd for $C_6H_{11}NOS$: N, 9.65. Found: N, 10.20, 10.09.

This product when sprayed as an aqueous solution in 2% concentration against houseflies gave the same performance noted above for its lower homolog with the exception that a 95% kill was here obtained. Against aphids and red spiders, a 2% acetone solution of the product gave 98 and 90% kills respectively.

Other esters and alcohols may be employed in the above alcoholysis reaction although the acetates and methanol are preferable because of the ease of separation of the azeotropic mixture from the thiocyanoalkanol. Ester-interchange catalysts which may be employed include aromatic sulfonic acids, e. g. benzenesulfonic acid, mineral acids, and the like.

Alternatively the alpha,omega-thiocyanoalkanols of this invention can be prepared by thiocyanation, that is, the replacement of halogen, preferably chlorine and bromine since these are the cheapest and react suitably, with a thiocyano group with or without diluent. However, it is preferred to use solvents and preferably polar solvents, in which the reactants are appreciably soluble since such solvents usually assist in the intimate contact of the reactants and enable lower temperatures to be employed. Suitable solvents which may be employed include ketones such as acetone and methyl ethyl ketone, alcohols such as ethanol, propanol, butanol and cyclohexanol, and the like.

Various inorganic salts of thiocyanic acid may be employed in this process among which may be mentioned sodium, potassium, calcium, zinc, barium, lead and ammonium thiocyanates. It is preferred, however, to use metal thiocyanates of groups I and II of the periodic table of elements because these are the most readily available, particularly as the anhydrous salts, and in general are less likely to result in side reaction by-products. At least a molar equivalent and preferably a 10–50% molar excess of the metal thiocyanate to the halogenoalkanol is used in preparing the thiocyanoalkanols of this invention. The temperature at which this thiocyanation process is conducted may vary between 50–150° C. and from 0.5–5 hours depending on the particular halogenoalkanol employed.

The new thiocyanoalkanols of the invention are non-irritating, substantially odorless and colorless oils which are surprisingly water-soluble, a property which makes them unique for a variety of applications particularly in the insecticide field. Furthermore their unusually rapid paralytic action against insects such as houseflies makes them singularly well-suited for application in household sprays, particularly in view of their freedom from the objectionable oily residues of the hydrocarbon sprays now in current use.

The new thiocyanoalkanols of this invention can be used in various insecticidal compositions where ingestion, contact, or repellent action is desired for the control of insects. They can be formulated with appropriate insecticidal adjuvants in the form of solutions, dust compositions or with dispersing agents. Preferably however, they are used in the form of solutions in suitable solvents such as for example, with water; ketones such as cyclohexanone and acetone; alcohols such as those named above; various mixtures of the above solvents such as mixtures of water and ketones, water and alcohols, hydrocarbons, e. g. kerosene, and ketones such as acetone, etc. By the term "insecticidal adjuvant" I mean a substance which is capable of presenting or aiding in the presentation of an insect-toxicant to the insect.

The new alpha, omega-thiocyanoalkanols are also useful as pickling acid inhibitors and as synthetic intermediates for the manufacture of pharmaceuticals, fungicides and insecticides.

As many apparently widely different embodiments of this invention may be made without departing from the spirit and scope thereof, it is to be understood that this invention is not limited to the specific embodiments thereof except as defined in the appended claims.

I claim:

1. An insecticidal composition containing as an essential active ingredient in solution in a solvent selected from the group consisting of ketones and water, an alpha, omega-thiocyanoalkanol having the formula $HO(CH_2)_nSCN$, wherein $n$ is 4 to 5 inclusive.

2. An insecticidal composition containing as an essential active ingredient in solution in water, an alpha, omega-thiocyanoalkanol having the formula $HO(CH_2)_nSCN$, wherein $n$ is 4 to 5 inclusive.

3. An insecticidal composition containing as an essential active ingredient in solution in water, the chemical compound 4-thiocyanobutanol-1.

4. An insecticidal composition containing as an essential active ingredient in solution in water, the chemical compound 5-thiocyanopentanol-1.

5. A method of controlling insects which comprises spraying and applying to an insect a composition containing as an essential active ingredient in solution in a solvent selected from the class consisting of ketones and water, an alpha, omega-thiocyanoalkanol having the formula $HO(CH_2)_nSCN$ wherein $n$ is 4 to 5 inclusive.

6. A method of controlling insects which comprises spraying and applying to an insect a composition containing as an essential active ingredient in solution in water, 4-thiocyanobutanol-1.

7. A method of controlling insects which comprises spraying and applying to an insect a composition containing as an essential active ingredient in solution in water, 5-thiocyanopentanol-1.

NORMAN E. SEARLE.

REFERENCES CITED

The following references are of record in the file of this patent:

UNITED STATES PATENTS

| Number | Name | Date |
|---|---|---|
| 1,808,893 | Heckert | June 9, 1931 |
| 2,024,098 | Heckert | Dec. 10, 1935 |
| 2,339,050 | Carson | Jan. 11, 1944 |
| 2,343,448 | Bousquet | Feb. 2, 1944 |
| 2,372,809 | Bruson | Apr. 3, 1945 |
| 2,394,915 | Jones | Feb. 2, 1946 |
| 2,395,454 | Bruson | Feb. 26, 1946 |
| 2,412,799 | Bruson | Dec. 17, 1946 |
| 2,416,004 | Hall | Feb. 18, 1947 |
| 2,433,742 | Davis | Dec. 30, 1947 |
| 2,467,235 | Searle | Apr. 12, 1949 |

OTHER REFERENCES

"Chemical Abstracts," vol. 32 (1938), col. 2534, abstracts of three papers in J. Gen. (U. S. S. R.) by Sergeev et al.

"Chemical Abstracts," vol. 32 (1938), col. 2940, abstract of paper by Sergeev et al.

"Chemical Abstracts," vol. 32 (1938), cols. 5871–72, abstract of paper by Guthrie in "Contrib. Boyce Thompson Inst.," 9, 265–72 (1938).

Migrdichian: "Chemistry of Organic Cyanogen Compounds" (1947), page 375.